United States Patent
Kim (10) Patent No.: US 9,825,775 B2
(45) Date of Patent: Nov. 21, 2017

(54) LOCAL INTERCONNECT NETWORK SYSTEM AND METHOD, AND COMPUTER READABLE MEDIUM FOR IMPLEMENTING THE METHOD

(71) Applicants: HYUNDAI MOTOR Company, Seoul (KR); KIA MOTORS CORPORATION, Seoul (KR)

(72) Inventor: Soo Yun Kim, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 203 days.

(21) Appl. No.: 14/716,845

(22) Filed: May 19, 2015

(65) Prior Publication Data

US 2016/0173294 A1 Jun. 16, 2016

(30) Foreign Application Priority Data

Dec. 16, 2014 (KR) ........................ 10-2014-0180994

(51) Int. Cl.
*H04L 12/40* (2006.01)
*H04L 12/403* (2006.01)
*H04L 12/26* (2006.01)

(52) U.S. Cl.
CPC ...... *H04L 12/40039* (2013.01); *H04L 12/403* (2013.01); *H04L 43/0817* (2013.01); *H04L 2012/40234* (2013.01); *H04L 2012/40273* (2013.01)

(58) Field of Classification Search
CPC ............. H04L 12/40039; H04L 12/403; H04L 43/0817; H04L 2012/40234; H04L 2012/40273
See application file for complete search history.

(56) References Cited

U.S. PATENT DOCUMENTS

| | | | |
|---|---|---|---|
| 2010/0106991 A1 | 4/2010 | Noller | |
| 2013/0073761 A1* | 3/2013 | Nierop | ............. H04L 12/40045 710/110 |
| 2013/0318380 A1 | 11/2013 | Behrens et al. | |

FOREIGN PATENT DOCUMENTS

| | | |
|---|---|---|
| CN | 202899882 U | 4/2013 |
| EP | 1 355 456 A1 | 10/2003 |
| JP | 10-107805 A | 4/2008 |
| JP | 2013-107453 A | 6/2013 |

OTHER PUBLICATIONS

Introduction of LIN (Local Interconnect Network) bus, National Instruments, Oct. 22, 2009. 21 pgs. (w/ English translation).

* cited by examiner

*Primary Examiner* — Jianye Wu
(74) *Attorney, Agent, or Firm* — McDermott Will & Emery LLP (57) ABSTRACT

A LIN communication system includes a master controller, and at least one slave controller connected to the master controller via local interconnect network (LIN) communication. The master controller allows the at least one slave controller to enter a sleep mode in a normal situation through a sleep mode message of an unconditional frame provided via the LIN communication and checks a failure state of the at least one slave controller in an abnormal situation.

32 Claims, 6 Drawing Sheets

LOCAL INTERCONNECT NETWORK SYSTEM AND METHOD, AND COMPUTER READABLE MEDIUM FOR IMPLEMENTING THE METHOD

CROSS REFERENCE TO RELATED APPLICATION

This application claims the benefit of priority to Korean Patent Application No. 10-2014-0180994, filed on Dec. 16, 2014, which is hereby incorporated by reference as if fully set forth herein.

TECHNICAL FIELD

The present disclosure relates to a local interconnect network (LIN) system and method, and a computer readable medium for implementing the method, and more particularly, to a LIN system and method, and a computer readable medium for implementing the method for efficient network management between a master controller and a slave controller.

BACKGROUND

In general, controller area network (CAN) communication and local interconnect network (LIN) communication have been widely used for vehicles for communication between two arbitrary devices.

The LIN communication refers to a serial communication method used for decentralization a CAN communication system of a body network of a vehicle as a protocol that is developed based on CAN communication. The LIN communication controls an electronic control unit (ECU) with a simple function, such as a sensor and an actuator on a network, and has been gradually used due to its advantage of configuring a network with low development costs in accordance with current trends.

The LIN communication includes a master controller and a slave controller, which request data, and transmits a diagnostic frame between the master controller and the slave controller.

The diagnostic frame is a schedule frame and performs a function such as memory dump, reprogramming, and configuration (read/write) of nodes via long (up to 4095) bytes communication unlike LIN communication of a general signal base.

Conventionally, information cannot be transmitted between a master controller and a slave controller when data is transmitted to a diagnostic frame during use of a sleep command using the diagnostic frame.

In addition, data is not transmitted to a bus from a master controller, and thus, the bus needs to be an idle state, a slave controller needs to check whether a bus idle state is maintained, and time for entrance to a sleep mode (which is generally used in power-off) is delayed when the bus idle state is maintained for about four seconds or more.

SUMMARY

The present invention is directed to a local interconnect network (LIN) system and method, and a computer readable medium for implementing the method that substantially obviate one or more problems due to limitations and disadvantages of the related art.

An aspect of the present inventive concept provides a local interconnect network (LIN) system and method, and a computer readable medium for implementing the method, for reducing a sleep mode entrance time and diagnosing failure of a slave controller using a sleep mode message of an unconditional frame.

Additional advantages, objects, and features of the disclosure will be set forth in part in the description which follows and in part will become apparent to those having ordinary skill in the art upon examination of the following or may be learned from practice of the disclosure. The objectives and other advantages of the inventive concept may be realized and attained by the structure particularly pointed out in the written description and claims hereof as well as the appended drawings.

According to an exemplary embodiment of the present inventive concept, a local interconnect network (LIN) communication system includes a master controller, and at least one slave controller connected to the master controller via local interconnect network (LIN) communication. The master controller allows the slave controller to enter a sleep mode in a normal situation through a sleep mode message of an unconditional frame provided via the LIN communication and checks a failure state of the slave controller in an abnormal situation.

The master controller may change a stored sleep request value to a sleep mode entrance preparation value, add the sleep mode entrance preparation value to the sleep mode message, and transmit the sleep mode message to the slave controller.

The slave controller may change the received sleep mode entrance preparation value to a sleep mode entrance complete value, add the sleep mode entrance complete value to the sleep mode message, and transmit the sleep mode message to the master controller. The master controller may enter a sleep mode upon checking the received sleep mode entrance complete value The master controller may change the received sleep mode entrance complete value to a sleep mode entrance value, add the sleep mode entrance value to the sleep mode message, and transmit the sleep mode message to the slave controller. The slave controller may enter the sleep mode upon checking the received sleep mode entrance value.

The master controller may determine the failure state when the master controller does not receive the sleep mode entrance complete value through the sleep mode message for a preset period of time.

The master controller may add a generated or stored sleep mode compulsory-entrance request value to the sleep mode message and transmit the sleep mode message to the slave controller when power of the slave controller is abnormal as a determination result.

The master controller may perform failure diagnosis of the corresponding slave controller when power of the slave controller is normal as a determination result.

According to another exemplary embodiment of the present inventive concept, a local interconnect network (LIN) communication method includes connecting a master controller and at least one slave controller via local interconnect network (LIN) communication. The slave controller is allowed to enter a sleep mode in a normal situation by the master controller through a sleep mode message of an unconditional frame provided via the LIN communication.

A failure state of the slave controller is checked in an abnormal situation through the sleep mode message.

The step of allowing may further include changing a sleep request value stored in the master controller to a sleep mode entrance preparation value, adding the changed sleep mode entrance preparation value to the sleep mode message, and transmitting the sleep mode message to the slave controller, by the master controller.

The step of allowing may further include changing the received sleep mode entrance preparation value to a sleep mode entrance complete value, adding the sleep mode entrance complete value to the sleep mode message, and transmitting the sleep mode message, by the slave controller. The step of allowing may further include entering the sleep mode upon checking the received sleep mode entrance complete value, by the master controller.

The step of allowing may include changing the received sleep mode entrance complete value to a sleep mode entrance value, adding the sleep mode entrance value to the sleep mode message, and transmitting the sleep mode message to the slave controller.

The step of allowing may further include entering the sleep mode upon checking the received sleep mode entrance value.

The step of checking may include determining the failure state by the master controller when the master controller does not receive the sleep mode entrance complete value through the sleep mode message for a preset period of time.

The step of checking may include adding a generated or stored sleep mode compulsory-entrance request value to the sleep mode message and transmitting the sleep mode message to the slave controller when power of the slave controller is abnormal as a determination result.

The step of checking may include performing failure diagnosis of the corresponding slave controller by the master controller when power of the slave controller is normal as a determination result.

According to yet another exemplary embodiment of the present inventive concept, a local interconnect network (LIN) communication system includes a master controller, and at least one slave controller connected to the master controller via local interconnect network (LIN) communication. The master controller includes a sleep mode processor configured to allow the slave controller to enter a sleep mode through a sleep mode message of an unconditional frame provided via the LIN communication. A compulsory sleep mode processor is configured to allow the slave controller to compulsorily enter the sleep mode when the slave controller does not enter the sleep mode by the sleep mode processor.

According to still another exemplary embodiment of the present inventive concept, a local interconnect network (LIN) communication method includes connecting a master controller and at least one slave controller via local interconnect network (LIN) communication. The slave controller is allowed to enter a sleep mode through a sleep mode message of an unconditional frame provided via the LIN communication, by a sleep mode processor. The slave controller is allowed to compulsorily enter the sleep mode when the slave controller does not enter the sleep mode in the step of allowing the slave controller to enter the sleep mode, by a compulsory sleep mode processor.

BRIEF DESCRIPTION OF THE DRAWINGS

The accompanying drawings, which are included to provide a further understanding of the disclosure and are incorporated in and constitute a part of this application, illustrate embodiment(s) of the inventive concept and together with the description serve to explain the principle of inventive concept.

DETAILED DESCRIPTION

Reference will now be made in detail to the exemplary embodiments of the present inventive concept, examples of which are illustrated in the accompanying drawings. Wherever possible, the same reference numbers will be used throughout the drawings to refer to the same or like parts.

First Embodiment

Figure 1:
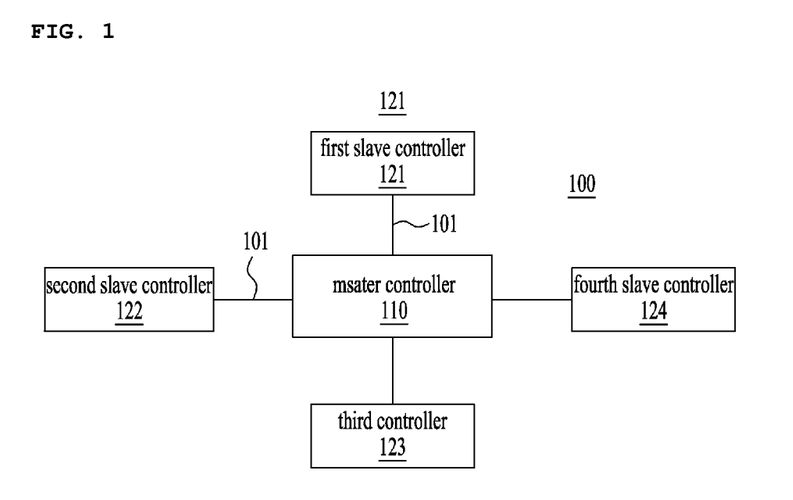
FIG. 1 is a diagram illustrating a structure of a local interconnect network (LIN) communication system according to a first embodiment of the present inventive concept.
Figure 2:
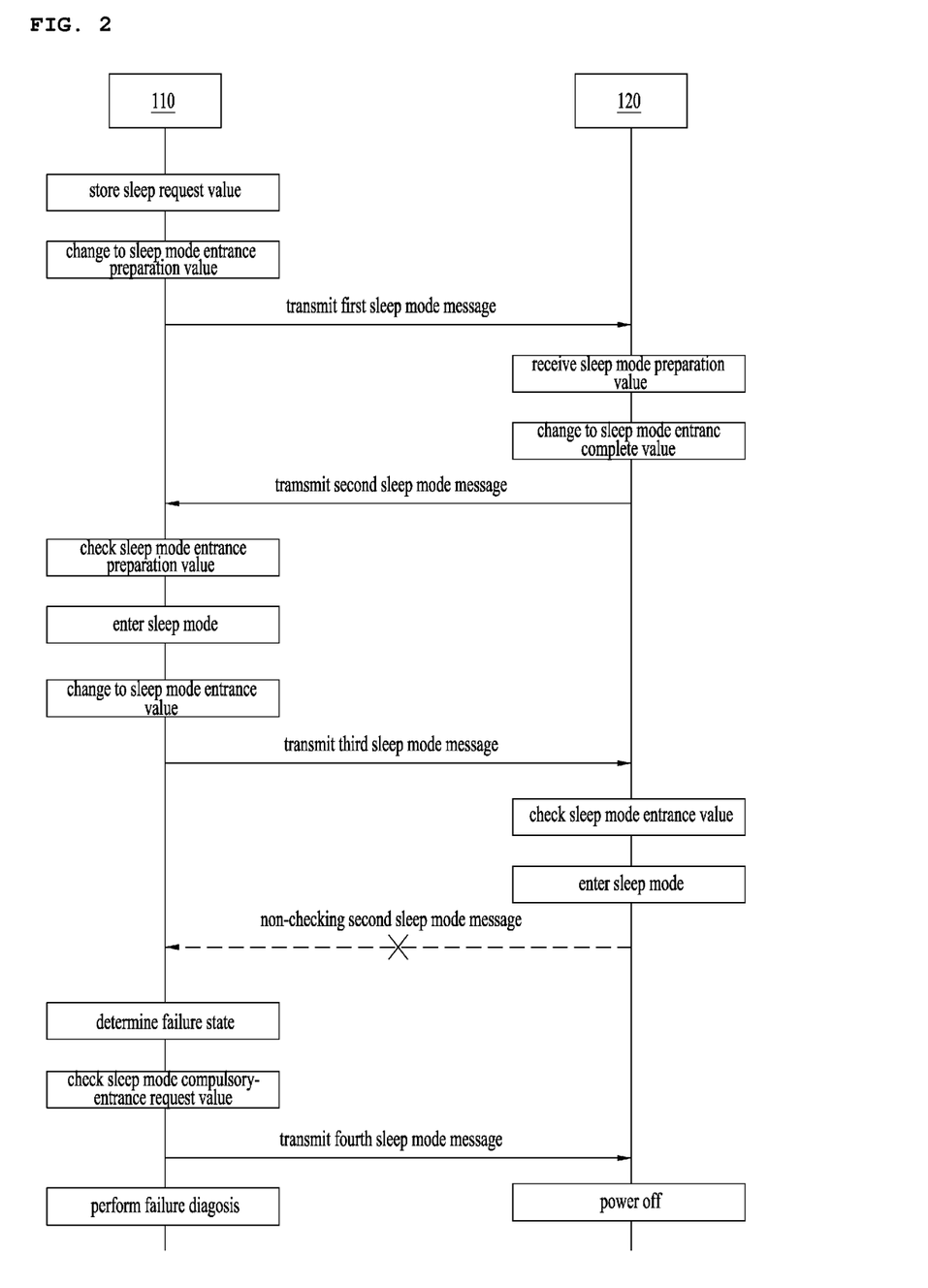
FIG. 2 is a diagram illustrating a structure of an unconditional frame transmitted and received by the LIN communication system according to the first embodiment of the present inventive concept.

FIG. 1 is a diagram illustrating a structure of a local interconnect network (LIN) communication system 100 according to a first embodiment of the present inventive concept. FIG. 2 is a diagram illustrating a structure of an unconditional frame transmitted and received by the LIN communication system 100 according to the first embodiment of the present inventive concept.

Referring to FIG. 1, the LIN communication system 100 according to the first embodiment includes a master controller 110 and slave controllers 120.

The master controller 110 according to the present disclosure is connected to the slave controllers 120 that will be described below via local interconnect network (LIN) communication 101 and transmits and receives an unconditional frame to and from the slave controllers 120.

Examples of forms of the unconditional frame are shown in Tables 1 and 2 below, which are well known in LIN communication. In addition, according to the first embodiment of the present inventive concept, a sleep mode message (LIN_ReqSleep or LIN-LBRespSleep) for entrance of the slave controllers 120 to a sleep mode is added to the unconditional frame.

TABLE 1

| DATA | 7 | 6 | 5 | 4 | 3 | 2 | 1 | 0 |
|---|---|---|---|---|---|---|---|---|
| FID | | | | 0x30 | | | | |
| PID | | | | 0xF0 | | | | |
| DATA 1 | LIN-CountryCfg | | LIN-LockStatus | | LIN-AltL | | LIN-IGNSw | |
| . | | | . | | | . | | . |
| . | | | . | | | . | | . |
| . | | | . | | | . | | . |
| DATA 5 | | | | | | | LIN-Cooler Sw | LIN-Heater Sw |
| DATA 6 | LIN-ARSLINError | LIN_ReqSleep | | LIN-LBRespReprogram | | | | LIN-ARSSOH |

TABLE 2

| DATA | 7 | 6 | 5 | 4 | 3 | 2 | 1 | 0 |
|---|---|---|---|---|---|---|---|---|
| FID | | | | 0x03 | | | | |
| PID | | | | 0x73 | | | | |
| DATA 1 | | | | LIN-LBOTC | | | | |
| DATA 2 | LIN-LBLINError | LIN-LBRespSleep | LIN-LBRespReprogram | | | | | LIN-LBSOH |

The sleep mode message will be described below in more detail.

The slave controllers 120 according to the present inventive concept include at least one slave controller 121 to 124 and are connected to the master controller 110 via the LIN communication 101 so as to transmit and receive the sleep mode message of the aforementioned unconditional frame.

The master controller 110 that transmits and receives the unconditional frame is, for example, an air conditioner controller. The slave controllers 120 may be at least one controller, for example, a wind screen heater, an air quality sensor, and a cooling fan. These are merely examples, and an electronic control unit (ECU) installed in a vehicle and any device controlled by the ECU are within the scope of the present disclosure.

The master controller 110 according to the present disclosure allows the slave controllers 120 to enter the sleep mode in a normal situation through the sleep mode message of the unconditional frame generated (provided) via the LIN communication 101 and checks a failure state of the slave controllers 120 in an abnormal situation.

In order to allow the slave controllers 120 to enter the sleep mode in the normal case, the master controller 110 according to the present disclosure changes a stored sleep request value to a sleep mode entrance preparation value (e.g. 0X01), adds the changed sleep mode entrance preparation value to a first sleep mode message of an unconditional frame, and then transmits the first sleep mode message to the slave controllers 120, as illustrated in FIG. 2. In this case, the first sleep mode message may be a sleep request message having the sleep mode entrance preparation value.

In this case, the slave controllers 120 according to the present disclosure change the sleep mode entrance preparation value received through the first sleep mode message to a sleep mode entrance complete value (e.g. 0X03). In this case, the changed sleep mode entrance complete value indicates that all controllers complete sleep mode entrance preparation.

When the sleep mode entrance preparation value is changed to the sleep mode entrance complete value, the slave controllers 120 according to the present disclosure may add the changed sleep mode entrance complete value to a second sleep mode message of the unconditional frame and transmit the second sleep mode message to the master controller 110. In this case, the second sleep mode message may be a sleep response message with respect to the sleep request message.

Then the master controller 110 according to the present disclosure enters a sleep mode upon checking the sleep mode entrance complete value received through the second sleep mode message.

As described above, the master controller 110 that enters the sleep mode may change the sleep mode entrance complete value received from the slave controllers 120 to a sleep mode entrance value (e.g. 0X03), add the sleep mode entrance value to a third sleep mode message, and transmit the third sleep mode message to the slave controllers 120. In this case, the third sleep mode message may be a confirmation message indicating entrance to the sleep mode.

Accordingly, upon checking the changed sleep mode entrance value, the slave controllers 120 enter the sleep mode. When the sleep request message and the sleep response message are transmitted and received between the master controller 110 and the slave controllers 120, it may be confirmed that all of the master controller 110 and the slave controllers 120 normally enter the sleep mode. Thus, according to the first embodiment, final entrance time to a sleep mode can be reduced.

The master controller 110 according to the present disclosure may check a failure state of the slave controllers 120 in an abnormal situation, which will now be described. First, the master controller 110 according to the present disclosure may not receive the sleep mode entrance complete value through the aforementioned second sleep mode message for a preset period of time.

When the master controller 110 does not receive the sleep mode entrance complete value, the master controller 110 may determine the failure state. In this case, the failure state may include two examples.

That is, as a determination result upon determining that power of the slave controllers 120 is abnormal, the master controller 110 according to the present disclosure may generate a sleep mode compulsory-entrance request value (e.g. 0X03), add the sleep mode compulsory-entrance request value to a fourth sleep mode message, and transmit the fourth sleep mode message to the slave controllers 120, or may transmit a pre-stored sleep mode compulsory-entrance request value (e.g. 0X03) to the slave controllers 120.

As the determination result, upon determining that the power of the slave controllers 120 is normal, the master controller 110 may perform failure diagnosis of the slave controllers 120 in which a failure occurs.

As such, more stable driving can be ensured by monitoring the failure state with respect to an abnormal sleep mode as well as power-off of the slave controllers 120.

Figure 3:
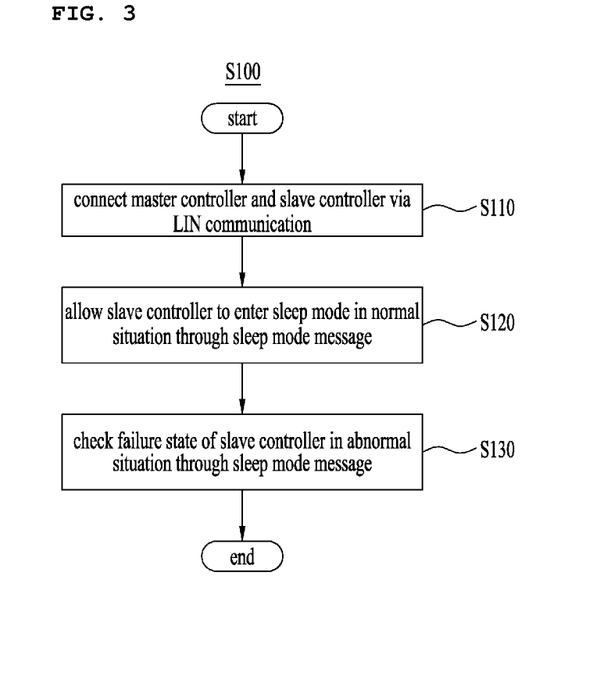
FIG. 3 is a flowchart of a LIN communication method of the LIN communication system according to the first embodiment of the present inventive concept.
Figure 4:
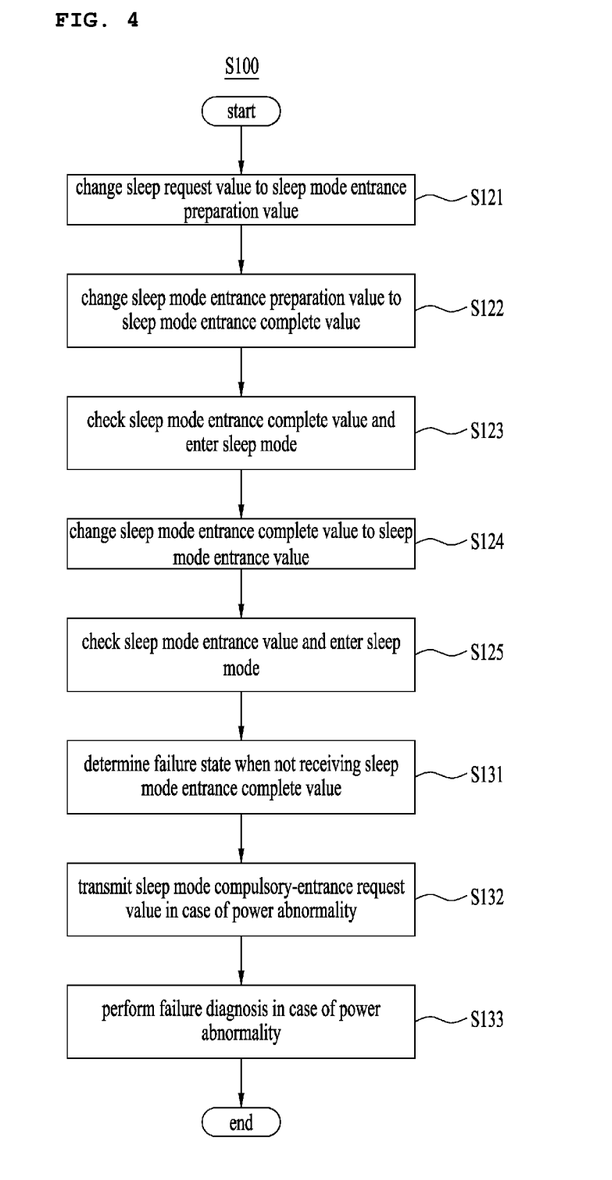
FIG. 4 is a flowchart illustrating operations of the LIN communication method in detail according to the first embodiment of the present inventive concept.

FIG. 3 is a flowchart of a LIN communication method of the LIN communication system according to the first embodiment of the present inventive concept. FIG. 4 is a flowchart illustrating operations of the LIN communication method in detail according to the first embodiment of the present inventive concept.

As illustrated in the diagrams, the LIN communication method of the LIN communication system 100 according to the first embodiment of the present inventive concept includes operations S110 to S130 in order to allow a slave controller 120 to enter a sleep mode or to monitor a failure state when the slave controller 120 does not enter the sleep mode.

First, in operation S110 according to the present disclosure, the master controller 110 and the at least one slave controller 120 are connected via the LIN communication 101. When the master controller 110 and the slave controllers 120 are connected via the LIN communication 101, an unconditional frame as one type of a LIN communication frame is transmitted between the master controller 110 and the slave controllers 120.

Examples of forms of the unconditional frame are shown in Tables 1 and 2 above, which are generally known in LIN communication. In addition, according to the first embodiment, a sleep mode message may be added to the unconditional frame in order to allow the slave controllers 120 to enter the sleep mode.

Then, in operation S120 according to the present disclosure, the master controller 110 allows the slave controllers 120 to enter the sleep mode in a normal situation through the sleep mode message of the unconditional frame provided via the LIN communication 101 connected in the aforementioned operation S110.

In this case, an attempt to entrance to a sleep mode is performed in order to power-off the at least one slave controller 120.

Operation S120 according to the present disclosure includes operations S121 to S125, as illustrated in FIG. 4. First, in operation S121 according to the present disclosure, the master controller 110 changes a stored sleep request value to a sleep mode entrance preparation value (e.g. 0X01), adds the changed sleep mode entrance preparation value to a first sleep mode message of an unconditional frame, and then transmits the first sleep mode message to the slave controllers 120.

In this case, the first sleep mode message may be a sleep request message including the sleep mode entrance preparation value.

In operation S122 according to the present disclosure, the slave controllers 120 change the sleep mode entrance preparation value received through the first sleep mode message to a sleep mode entrance complete value (e.g. OX03). In this case, the changed sleep mode entrance complete value indicates that all controllers complete sleep mode entrance preparation.

When the sleep mode entrance preparation value is changed to the sleep mode entrance complete value, the slave controllers 120 may add the changed sleep mode entrance complete value to a second sleep mode message of the unconditional frame and transmit the second sleep mode message to the master controller 110. In this case, the second sleep mode message may be a sleep response message with respect to the sleep request message.

Then, in operation S123 according to the present disclosure, the master controller 110 enters a sleep mode upon checking the sleep mode entrance complete value received through the second sleep mode message.

Then, in operation S124 according to the present disclosure, the master controller 110 may change the sleep mode entrance complete value received from the slave controllers 120 to a sleep mode entrance value (e.g. 0X03), add the sleep mode entrance value to a third sleep mode message, and transmit the third sleep mode message to the slave controllers 120.

In this case, the third sleep mode message may be a confirmation message indicating entrance to a sleep mode.

In operation S125 according to the present disclosure, upon checking the changed sleep mode entrance value, the slave controllers 120 enter the sleep mode. When the sleep request message and the sleep response message are transmitted and received between the master controller 110 and the slave controllers 120, it may be confirmed that all of the master controller 110 and the slave controllers 120 normally enter a sleep mode. Thus, according to the first embodiment of the present inventive concept, final entrance time to the sleep mode can be reduced.

Referring back to FIG. 3, in operation S130 according to the present disclosure, the master controller 110 checks the failure state of the slave controllers 120 in the abnormal situation. To this end, as illustrated in FIG. 4, operations S131 to S133 are performed. That is, first, in operation S131 according to the present disclosure, the master controller 110 may not receive the sleep mode entrance complete value through the aforementioned second sleep mode message for a preset period of time.

When the master controller 110 does not receive the sleep mode entrance complete value, the master controller 110 may determine the failure state. In this case, the failure state may include two examples.

That is, in operation S132 according to the present disclosure, as the determination result of the aforementioned operation S131, upon determining that power of the slave controllers 120 is abnormal, the master controller 110 may generate a sleep mode compulsory-entrance request value (e.g. OX03), add the sleep mode compulsory-entrance request value to a fourth sleep mode message, and transmit the fourth sleep mode message to the slave controllers 120, or may transmit a pre-stored sleep mode compulsory-entrance request value (e.g. OX03) to the slave controllers 120.

Upon determining that power of the slave controllers 120 is normal as a determination result, the master controller 110 may perform failure diagnosis of the slave controllers 120 in which a failure occurs in operation S133 according to the present disclosure.

As such, more stable driving can be ensured by monitoring the failure state with respect to an abnormal sleep mode as well as power-off of the slave controllers 120 as an original purpose.

Second Embodiment

Figure 5:
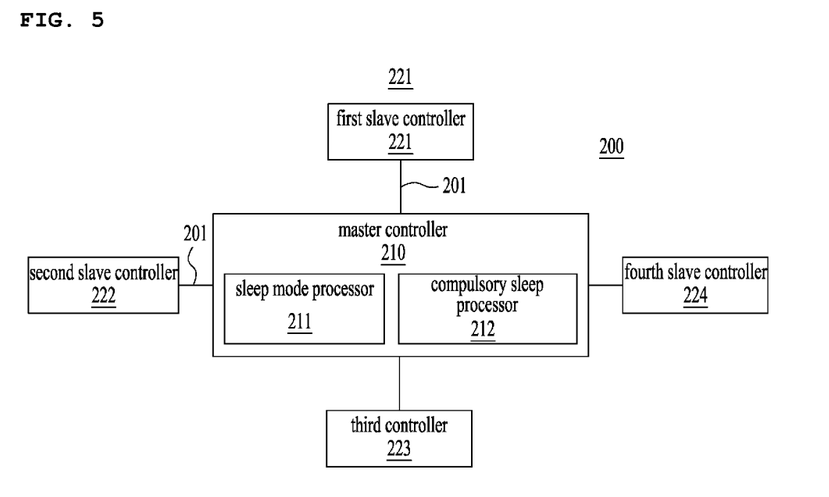
FIG. 5 is a diagram illustrating an example of a LIN communication system according to a second embodiment of the present inventive concept.

FIG. 5 is a diagram illustrating an example of a LIN communication system according to a second embodiment of the present inventive concept.

Referring to FIG. 5, a LIN communication system 200 according to a second embodiment of the present inventive concept includes a master controller 210 and slave controllers 220 including at least one slave controller 221 to 224 that are connected to the master controller 210 via LIN communication 201. The master controller 210 includes a sleep mode processor 211 and a compulsory sleep mode processor 212.

The sleep mode processor 211 according to the present disclosure transmits and receives an unconditional frame generated via the LIN communication 201 when the master controller 210 and the slave controllers 220 are connected via the LIN communication 201.

Examples of forms of the unconditional frame are shown in Tables 1 and 2 above, which are well known in LIN communication. In addition, according to the second embodiment of the present inventive concept, a sleep mode message (LIN_ReqSleep or LIN-LBRespSleep) may be added to the unconditional frame in order to allow the slave controllers 120 to enter a sleep mode.

The sleep mode processor 211 may allow the slave controllers 220 to enter the sleep mode using the sleep mode message.

The sleep mode processor 211 according to the present disclosure changes a stored sleep request value to a sleep mode entrance preparation value (e.g. 0X01), adds the changed sleep mode entrance preparation value to a sleep request message (sleep mode message) of an unconditional frame, and then transmits the sleep request message (sleep mode message) to the slave controllers 220.

In this case, the slave controllers 220 according to the present invention change the sleep mode entrance preparation value received through the sleep request message to a sleep mode entrance complete value (e.g. OX03). In this case, the changed sleep mode entrance complete value indicates that all controllers complete sleep mode entrance preparation.

when the sleep mode entrance preparation value is changed to the sleep mode entrance complete value, the slave controllers 220 according to the present disclosure may add the changed sleep mode entrance complete value to a sleep response message (sleep mode message) of the unconditional frame and transmit the sleep response message (sleep mode message) to the sleep mode processor 211 of the master controller 210.

Then, the sleep mode processor 211 according to the present disclosure enters a sleep mode at last upon checking the sleep mode entrance complete value received through the sleep response message.

The sleep mode processor 211 that enters a sleep mode may change the sleep mode entrance complete value received from the slave controllers 220 to a sleep mode entrance value (e.g. 0X03), add the sleep mode entrance value to a sleep confirmation message (sleep mode message), and transmit the sleep confirmation message (sleep mode message) to the slave controllers 220.

Accordingly, upon checking the changed sleep mode entrance value, the slave controllers 220 enter the sleep mode. When the sleep request message and the sleep response message are transmitted and received between the master controller 210 and the slave controllers 220, it may be confirmed that all of the master controller 210 and the slave controllers 220 normally enter a sleep mode. Thus, according to the second embodiment of the present inventive concept, final entrance time to the sleep mode can be reduced.

The compulsory sleep mode processor 212 according to the present disclosure may allow the slave controllers 220 to compulsorily enter the sleep mode when the aforementioned sleep mode processor 211 does not enter the sleep mode.

In other words, the compulsory sleep mode processor 212 according to the present disclosure may determine that power of the slave controllers 220 is abnormal when the compulsory sleep mode processor 212 does not receive the aforementioned sleep mode entrance complete value from the slave controllers 220 for a preset period of time.

Upon determining that power of the slave controllers 220 is abnormal, the compulsory sleep mode processor 212 according to the present disclosure may generate a sleep-mode compulsory entrance request value in response to the power abnormality, add the generated sleep-mode compulsory entrance request value to a sleep compulsory message (sleep mode message), and transmit the sleep compulsory message (sleep mode message) to the slave controllers 220.

Figure 6:
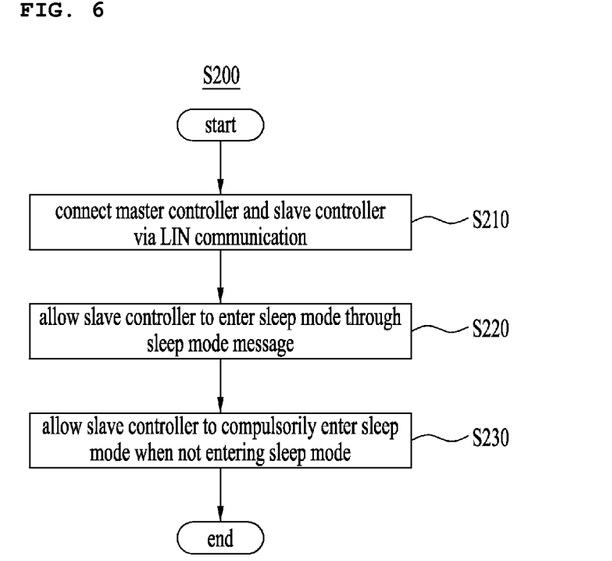
FIG. 6 is a flowchart of a LIN communication method of the LIN communication system according to the second embodiment of the present inventive concept.
Figure 7:
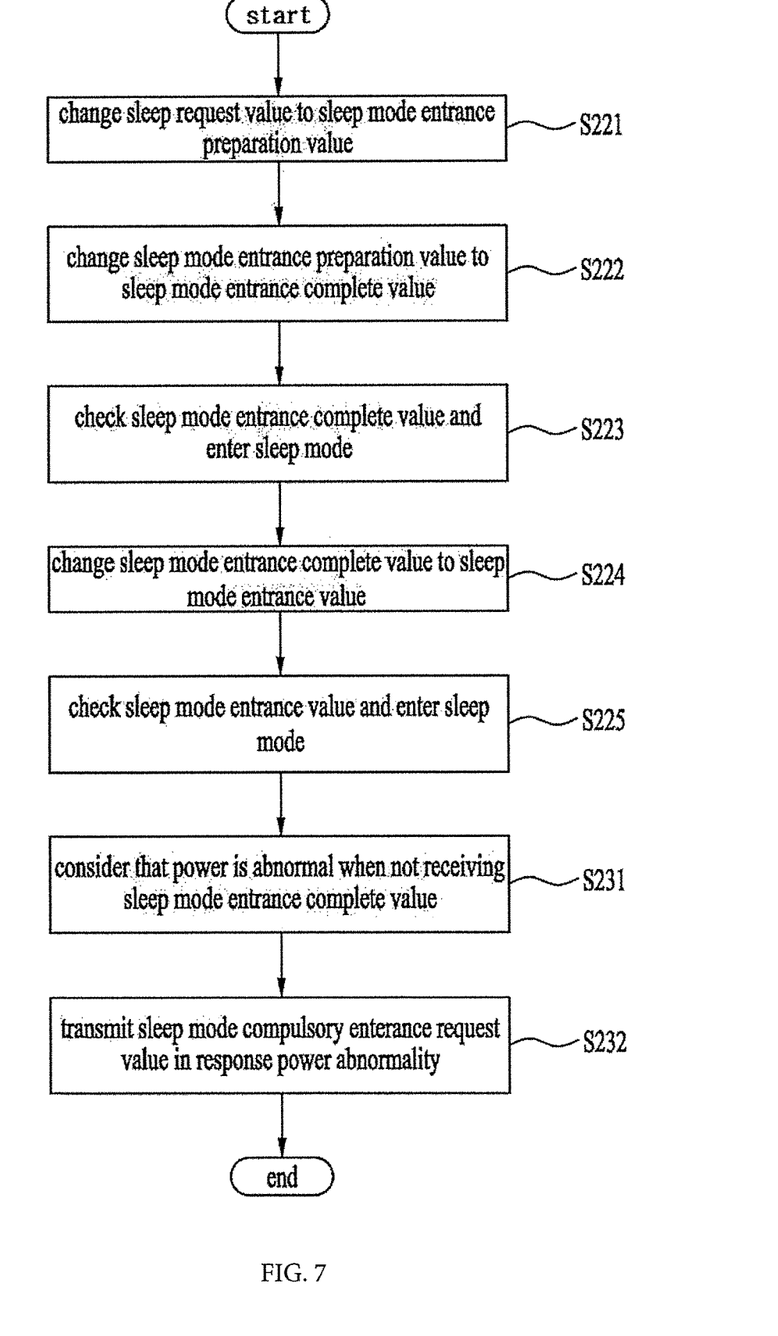
FIG. 7 is a flowchart illustrating operations of the LIN communication method according to the second embodiment of the present inventive concept.

As such, vehicle safety can be ensured by monitoring a failure state with respect to the case in which power of the slave controllers 220 is not off FIG. 6 is a flowchart of a LIN communication method of the LIN communication system according to the second embodiment of the present inventive concept. FIG. 7 is a flowchart illustrating operations of the LIN communication method according to the second embodiment of the present inventive concept.

The LIN communication method of the LIN communication system 200 according to the second embodiment of the present inventive concept includes operations S210 to S230 in order to allow the slave controller 220 to enter a sleep mode or to monitor a failure state when the slave controller 220 does not enter the sleep mode.

First, in operation S210 according to the present disclosure, the master controller 210 and at least one slave controller 220 are connected via the LIN communication 201. When the master controller 210 and the at least one slave controller 220 are connected via the LIN communication 201, an unconditional frame as one type of a LIN communication frame is transmitted between the master controller 210 and the slave controllers 220.

Examples of forms of the unconditional frame are shown in Tables 1 and 2 above, which are well known in LIN communication. In addition, according to the second embodiment of the present inventive concept, a sleep mode message may be added to the unconditional frame in order to allow the slave controllers 220 to enter the sleep mode.

In operation S220 according to the present disclosure, the sleep mode processor 211 allows the slave controllers 220 to enter the sleep mode through the sleep mode message of the unconditional frame provided via the LIN communication 201 connected in the aforementioned operation S210. In this case, attempt to enter the sleep mode is performed in order to power-off the at least one slave controller 220.

Operation S220 according to the present disclosure includes operations S221 to S225, as illustrated in FIG. 7. First, in operation S221 according to the present disclosure, the sleep mode processor 211 changes a sleep request value stored in the master controller 210 to a sleep mode entrance preparation value (e.g. 0X01), adds the changed sleep mode entrance preparation value to a sleep mode message of the unconditional frame, and then transmits the sleep mode message to the slave controllers 220. In this case, the sleep mode message may be a sleep request message including the sleep mode entrance preparation value.

Then, in operation S222 according to the present disclosure, the slave controllers 220 change the sleep mode entrance preparation value received through the sleep mode message to a sleep mode entrance complete value (e.g. OX03). The changed sleep mode entrance complete value indicates that all controllers complete sleep mode entrance preparation.

When the sleep mode entrance preparation value is changed to the sleep mode entrance complete value, the slave controllers 220 may add the changed sleep mode entrance complete value to the sleep mode message of the unconditional frame and transmit the sleep mode message to the sleep mode processor 211 of the master controller 210. In this case, the sleep mode message may be a sleep response message with respect to the sleep request message.

Then, in operation S223 according to the present disclosure, the sleep mode processor 211 enters the sleep mode upon checking the sleep mode entrance complete value received through the sleep mode message.

As described above, in operation S224 according to the present disclosure, the sleep mode processor 211 may change the sleep mode entrance complete value received from the slave controllers 220 to a sleep mode entrance value (e.g. 0X03), add the sleep mode entrance value to a sleep mode message, and transmit the sleep mode message to the slave controllers 220. In this case, the sleep mode message may be a confirmation message indicating entrance to the sleep mode.

Then, in operation S225 according to the present disclosure, upon checking the changed sleep mode entrance value, the slave controllers 220 enter the sleep mode.

As such, when the sleep mode messages are transmitted and received between the master controller 210 and the slave controllers 220, it may be confirmed that all of the master controller 210 and the slave controllers 220 normally enter a sleep mode. Thus, according to the second embodiment of the present inventive concept, final entrance time to the sleep mode can be reduced.

Referring back to FIG. 6, operation S230 will now be described. In operation S230 according to the present disclosure, when the slave controllers 220 do not enter the sleep mode in the aforementioned S230, the compulsory sleep mode processor 212 allows the slave controllers 220 to compulsorily enter the sleep mode.

To this end, as illustrated in FIG. 7, operations S231 and S232 are performed. That is, in operation S231 according to the present disclosure, when the compulsory sleep mode processor 212 does not receive the aforementioned sleep mode entrance complete value from the slave controllers 220 for a preset period of time, the compulsory sleep mode processor 212 may determine that power of the slave controllers 220 is abnormal.

Upon determining that power of the controllers 220 is abnormal, in operation S232 according to the present disclosure, the compulsory sleep mode processor 212 may generate a sleep-mode compulsory entrance request value in response to the power abnormality of operation S231, add the generated sleep-mode compulsory entrance request value to a sleep compulsory message (sleep mode message), and transmit the sleep compulsory message (sleep mode message) to the slave controllers 220.

As such, vehicle safety can be ensured by monitoring a failure state with respect to the case in which power of the slave controllers 220 is not off as an original purpose.

As described above, according to the present disclosure, slave mode entrance delay can be prevented via a sleep mode message of an unconditional frame, thereby enhancing client convenience.

Further, power consumption of a vehicle battery can be reduced by preventing slave mode entrance delay.

In addition, user convenience can be enhanced via failure diagnosis and error detection of power management by controllers used for LIN.

Embodiments of the present inventive concept can include a computer readable medium including program commands for implementing operations implemented through various computers. The computer readable medium can store program commands, data files, data structures or combinations thereof. The program commands recorded in the medium may be specially designed and configured for the present disclosure or be known to those skilled in the field of computer software. Examples of a computer readable recording medium include magnetic media such as hard disks, floppy disks and magnetic tapes, optical media such as CD-ROMs and DVDs, magneto-optical media such as floppy disks, or hardware devices such as ROMs, RAMs, and flash memories, which are specially configured to store and execute program commands. Examples of the program commands include a machine language code created by a compiler and a high-level language code executable by a computer using an interpreter and the like. The hardware device may be configured as one or more software modules in order to perform processing according to the present disclosure, and vice versa.

It will be apparent to those skilled in the art that various modifications and variations can be made in the present disclosure without departing from the spirit or scope of the invention. Thus, it is intended that the present disclosure covers the modifications and variations of this invention provided they come within the scope of the appended claims and their equivalents.

What is claimed is:

1. A local interconnect network (LIN) communication system comprising:
   a master controller; and
   at least one slave controller connected to the master controller via local interconnect network (LIN) communication,
   wherein the master controller is configured to allow the at least one slave controller to enter a sleep mode in a normal situation through a sleep mode message of an unconditional frame provided via the LIN communication and to check a failure state of the at least one slave controller in an abnormal situation,
   wherein the master controller changes a stored sleep request value to a sleep mode entrance preparation value, adds the sleep mode entrance preparation value to the sleep mode message, and transmits the sleep mode message to the at least one slave controller.

2. The LIN communication system according to claim 1, wherein the at least one slave controller changes the received sleep mode entrance preparation value to a sleep mode entrance complete value, adds the sleep mode entrance complete value to the sleep mode message, and transmits the sleep mode message to the master controller.

3. The LIN communication system according to claim 2, wherein the master controller enters the sleep mode upon checking the received sleep mode entrance complete value.

4. The LIN communication system according to claim 3, wherein the master controller changes the received sleep mode entrance complete value to a sleep mode entrance value, adds the sleep mode entrance value to the sleep mode message, and transmits the sleep mode message to the at least one slave controller.

5. The LIN communication system according to claim 4, wherein the at least one slave controller enters the sleep mode upon checking the received sleep mode entrance value.

6. The LIN communication system according to claim 3, wherein the master controller determines the failure state when the master controller does not receive the sleep mode entrance complete value through the sleep mode message for a preset period of time.

7. The LIN communication system according to claim 6, wherein the master controller adds a generated or stored sleep mode compulsory-entrance request value to the sleep mode message and transmits the sleep mode message to the at least one slave controller when power of the at least one slave controller is abnormal as a determination result.

8. The LIN communication system according to claim 6, wherein the master controller performs failure diagnosis of the corresponding slave controller when power of the at least one slave controller is normal as a determination result.

9. A local interconnect network (LIN) communication method comprising steps of:
connecting a master controller and at least one slave controller via LIN communication;
allowing the at least one slave controller to enter a sleep mode in a normal situation by the master controller through a sleep mode message of an unconditional frame provided via the LIN communication; and
checking a failure state of the at least one slave controller in an abnormal situation through the sleep mode message,
wherein the step of allowing the at least one slave controller to enter a sleep mode further comprises changing a sleep request value stored in the master controller to a sleep mode entrance preparation value, adding the changed sleep mode entrance preparation value to the sleep mode message, and transmitting the sleep mode message to the at least one slave controller, by the master controller.

10. The LIN communication method according to claim 9, wherein the step of allowing further comprises changing the received sleep mode entrance preparation value to a sleep mode entrance complete value, adding the sleep mode entrance complete value to the sleep mode message, and transmitting the sleep mode message, by the at least one slave controller.

11. The LIN communication method according to claim 10, wherein the step of allowing further comprises entering the sleep mode upon checking the received sleep mode entrance complete value, by the master controller.

12. The LIN communication method according to claim 11, wherein the step of allowing comprises changing the received sleep mode entrance complete value to a sleep mode entrance value, adding the sleep mode entrance value to the sleep mode message, and transmitting the sleep mode message to the at least one slave controller.

13. The LIN communication method according to claim 12, wherein the step of allowing further comprises entering the sleep mode upon checking the received sleep mode entrance value.

14. The LIN communication method according to claim 11, wherein the step of checking comprises determining the failure state by the master controller when the master controller does not receive the sleep mode entrance complete value through the sleep mode message for a preset period of time.

15. The LIN communication method according to claim 14, wherein the step of checking comprises adding a generated or stored sleep mode compulsory-entrance request value to the sleep mode message and transmitting the sleep mode message to the at least one slave controller when power of the at least one slave controller is abnormal as a determination result.

16. The LIN communication method according to claim 15, wherein the step of checking further comprises performing failure diagnosis of the corresponding slave controller by the master controller when the power of the at least one slave controller is normal as a determination result.

17. A non-transitory computer readable medium comprising computer executable instructions execution of which causes a controller to perform the LIN communication method according to claim 9.

18. A local interconnect network (LIN) communication system comprising:
a master controller; and
at least one slave controller connected to the master controller via LIN communication,
wherein the master controller comprises:
a sleep mode processor configured to allow the at least one slave controller to enter a sleep mode through a sleep mode message of an unconditional frame provided via the LIN communication; and
a compulsory sleep mode processor configured to allow the at least one slave controller to compulsorily enter the sleep mode when the at least one slave controller dose not enter the sleep mode by the sleep mode processor,
wherein the sleep mode processor changes a stored sleep request value to a sleep mode entrance preparation value, adds the sleep mode entrance preparation value to the sleep mode message, and transmits the sleep mode message to the at least one slave controller.

19. The LIN communication system according to claim 18, wherein the at least one slave controller changes the received sleep mode entrance preparation value to a sleep mode entrance complete value, adds the sleep mode entrance complete value to the sleep mode message, and transmits the sleep mode message to the master controller.

20. The LIN communication system according to claim 19, wherein the sleep mode processor enters the sleep mode upon checking the received sleep mode entrance complete value.

21. The LIN communication system according to claim 20, wherein the sleep mode processor changes the received sleep mode entrance complete value to a sleep mode entrance value, adds the sleep mode entrance value to the sleep mode message, and transmits the sleep mode message to the at least one slave controller.

22. The LIN communication system according to claim 21, wherein the at least one slave controller enters the sleep mode upon checking the received sleep mode entrance value.

23. The LIN communication system according to claim 20, wherein the compulsory sleep mode processor determines that power of the at least one slave controller is abnormal when the compulsory sleep mode processor does not receive the sleep mode entrance complete value for a preset period of time.

24. The LIN communication system according to claim 23, wherein the compulsory sleep mode processor generates a sleep-mode compulsory entrance request value in response to the power abnormality, adds the generated sleep-mode compulsory entrance request value to the sleep mode message, and transmits the sleep mode message to the at least one slave controller.

25. A local interconnect network (LIN) communication method comprising steps of:

connecting a master controller and at least one slave controller via local interconnect network (LIN) communication; and allowing the at least one slave controller to enter a sleep mode through a sleep mode message of an unconditional frame provided via the LIN communication, by a sleep mode processor; and allowing the at least one slave controller to compulsorily enter the sleep mode when the at least one slave controller dose not enter the sleep mode in the step of allowing the at least one slave controller to enter the sleep mode, by a compulsory sleep mode processor, wherein the step of allowing the at least one slave controller to enter the sleep mode comprises changing a sleep request value stored in the sleep mode processor to a sleep mode entrance preparation value, adding the sleep mode entrance preparation value to the sleep mode message, and transmitting the sleep mode message to the at least one slave controller, by the sleep mode processor.

26. The LIN communication method according to claim 25, wherein the step of allowing the at least one slave controller to enter the sleep mode comprises changing the received sleep mode entrance preparation value to a sleep mode entrance complete value, adding the sleep mode entrance complete value to the sleep mode message, and transmitting the sleep mode message to the sleep mode processor, by the at least one slave controller.

27. The LIN communication method according to claim 26, wherein the step of allowing the at least one slave controller to enter the sleep mode comprises entering the sleep mode upon checking the received sleep mode entrance complete value, by the sleep mode processor.

28. The LIN communication method according to claim 27, wherein the step of allowing the at least one slave controller to enter the sleep mode comprises changing the received sleep mode entrance complete value to a sleep mode entrance value, adding the sleep mode entrance value to the sleep mode message, and transmitting the sleep mode message to the at least one slave controller, by the sleep mode processor.

29. The LIN communication method according to claim 28, wherein the step of allowing the at least one slave controller to enter the sleep mode comprises entering the sleep mode upon checking the received sleep mode entrance value, by the at least one slave controller.

30. The LIN communication method according to claim 29, wherein the step of allowing the at least one slave controller to compulsorily enter the sleep mode comprises determining that power of the at least one slave controller is abnormal by the compulsory sleep mode processor when the compulsory sleep mode processor does not receive the sleep mode entrance complete value for a preset period of time.

31. The LIN communication method according to claim 30, wherein the step of allowing the at least one slave controller to compulsorily enter the sleep mode comprises generating a sleep-mode compulsory entrance request value in response to the power abnormality, adding the generated sleep-mode compulsory entrance request value to the sleep mode message, and transmitting the sleep mode message to the at least one slave controller, by the compulsory sleep mode processor.

32. A non-transitory computer readable medium comprising computer executable instructions execution of which causes a controller to perform the LIN communication method according to claim 25.

* * * * *